United States Patent [19]
Boeckh et al.

[11] Patent Number: 5,739,241
[45] Date of Patent: Apr. 14, 1998

[54] VINYL FORMATE COPOLYMERS, PREPARATION THEREOF, AND USE THEREOF IN DETERGENTS AND CLEANERS

[75] Inventors: Dieter Boeckh, Limburgerhof; Axel Kistenmacher, Ludwigshafen; Walter Denzinger, Speyer; Thomas Rühl, Frankenthal; Angelika Funhoff, Schriesheim; Richard Baur, Mutterstadt; Alexander Kud, Eppelsheim; Volker Schwendemann, Neustadt, all of Germany

[73] Assignee: BASF Aktiengesellschaft, Ludwigshafen, Germany

[21] Appl. No.: 750,472

[22] PCT Filed: May 31, 1995

[86] PCT No.: PCT/EP95/02053

§ 371 Date: Dec. 16, 1996

§ 102(e) Date: Dec. 16, 1996

[87] PCT Pub. No.: WO95/34587

PCT Pub. Date: Dec. 21, 1995

[30] Foreign Application Priority Data

Jun. 16, 1994 [DE] Germany ............... 44 20 920.7

[51] Int. Cl.$^6$ ............... C08F 22/02; C08F 20/10
[52] U.S. Cl. ............... 526/318.2; 526/318.4
[58] Field of Search ............... 526/318.2, 318.4

[56] References Cited

U.S. PATENT DOCUMENTS 4,659,793  4/1987  Yang .
4,725,655  2/1988  Denzinger et al. .

FOREIGN PATENT DOCUMENTS 1805007  5/1969  Germany ............... 526/318.2

*Primary Examiner*—Joseph L. Schofer
*Assistant Examiner*—N. Sarofin
*Attorney, Agent, or Firm*—Oblon, Spivak, McClelland, Maier & Neustadt, P.C.

[57] ABSTRACT

Copolymers containing (a) from 5 to 90 mol % of vinyl formate units, (b) from 10 to 95 mol % of units of monoethylenically unsaturated carboxylic acids, (c) from 0 to 70 mol % of units of monoethylenically unsaturated dicarboxylic acids, and (d) from 0 to 30 mol % of units of other monoethylenically unsaturated monomers in copolymerized form and having K values of at least 8 (determined by the method of H. Fikentscher in 1% strength by weight aqueous solution on the sodium salt of the copolymers at pH 7 and 25° C.), processes for their preparation by copolymerizing monomer mixtures of (a) from 5 to 90 mol % of vinyl formate, (b) from 10 to 95 mol % of monoethylenically unsaturated carboxylic acids, (c) from 0 to 70 mol % of monoethylenically unsaturated dicarboxylic acids, and (d) from 0 to 30 mol % of other monoethylenically unsaturated monomers in an aqueous medium or in an organic solvent in the presence of free-radical polymerization initiators and use of the vinyl formate copolymers and of the vinyl alcohol copolymers obtainable therefrom by hydrolysis and/or oxidation as detergent and cleaner additives.

7 Claims, No Drawings

VINYL FORMATE COPOLYMERS, PREPARATION THEREOF, AND USE THEREOF IN DETERGENTS AND CLEANERS

BACKGROUND OF THE INVENTION

1. Field of the Invention

The present invention relates to vinyl formate copolymers, to processes for preparing them by copolymerizing vinyl formate in the presence of free-radical polymerization initiators, and to the use of the copolymers as additives in detergents and cleaners.

DISCUSSION OF THE BACKGROUND

U.S. Pat. No. 3,268,491 discloses a process for preparing copolymers of vinyl acetate and monoethylenically unsaturated dicarboxylic acids by copolymerizing the monomers in an aqueous medium at pH 3–6 in the presence of redox catalysts. The oxidizing component of the redox system is preferably a persulfate, while the reducing component is a sulfite or a thiosulfate. The oxidizing component is always used in molar excess compared with the reducing component. The copolymers obtained are alternating.

EP-A-0 441 022 discloses copolymers of monoethylenically unsaturated dicarboxylic acids and monoethylenically unsaturated monocarboxylic acids, which are prepared by copolymerizing from 3 to 25% by weight of at least one monoethylenically unsaturated dicarboxylic acid and from 75 to 97% by weight of at least one monoethylenically unsaturated monocarboxylic acid and optionally carboxyl-free ethylenically unsaturated monomers in the presence of water-soluble polymerization initiators, copper salts as polymerization moderator and a base. Vinyl acetate is mentioned as carboxyl-free ethylenically unsaturated monomer, but not exemplified. However, the polymerization conditions described are observed to lead to considerable decomposition of the vinyl acetate or the formation of homopolymers of vinyl acetate.

U.S. Pat. No. 3,887,480 describes the preparation of terpolymers containing from 35 to 70 mol % of maleic acid, from 20 to 45 mol % of vinyl acetate and from 2 to 40 mol % of acrylic acid in an aqueous medium in the presence of from 18 to 40% by weight of persulfate and in the presence of bisulfite, persulfate being used in molar excess over bisulfite.

In the above-described processes, the ethylenically unsaturated dicarboxylic acids are at least partially neutralized, since otherwise excessive decomposition of the vinyl acetate would occur during the polymerization.

Since the vinyl formate is even quicker to hydrolyze than vinyl acetate, the preparation of copolymers of vinyl formate is much more difficult than the preparation of vinyl acetate copolymers.

SUMMARY OF THE INVENTION

It is an object of the present invention to provide novel substances and to devise additives for detergents and cleaners.

We have found that this object is achieved according to the present invention by vinyl formate copolymers containing (a) from 5 to 90 mol % of vinyl formate units, (b) from 10 to 95 mol % of units of monoethylenically unsaturated carboxylic acids, (c) from 0 to 70 mol % of units of monoethylenically unsaturated dicarboxylic acids, and (d) from 0 to 30 mol % of units of other monoethylenically unsaturated monomers in copolymerized form and having K values of at least 8 (determined by the method of H. Fikentscher in 1% strength by weight aqueous Solution on the sodium salt of the copolymers at pH 7 and 25° C.).

The present invention also provides a process for preparing vinyl formate copolymers by copolymerizing monomer mixtures of (a) from 5 to 90 mol % of vinyl formate, (b) from 10 to 95 mol % of monoethylenically unsaturated carboxylic acids, (c) from 0 to 70 mol % of monoethylenically unsaturated dicarboxylic acids, and (d) from 0 to 30 mol % of other monoethylenically unsaturated monomers in an aqueous medium or in an organic solvent in the presence of free-radical polymerization initiators.

The present invention further provides for the use of the vinyl formate copolymers and of the vinyl alcohol copolymers obtainable therefrom by hydrolysis and/or oxidation as detergent and cleaner additives.

DETAILED DESCRIPTION OF THE PREFERRED EMBODIMENTS

The monomer mixtures used for preparing the copolymers comprise vinyl formate as monomer of group (a) and at least one monoethylenically unsaturated monocarboxylic acid as monomer of group (b). Said monomers (b) are derived for example from monoethylenically unsaturated monocarboxylic acids having from 3 to 8, preferably from 3 to 5, carbon atoms in the molecule. Examples thereof are acrylic acid, methacrylic acid, vinylacetic acid and crotonic acid. The preferred monomers of this group are acrylic acid, methacrylic acid and mixtures of acrylic acid and methacrylic acid in any desired ratio.

The copolymers of the present invention contain units of monoethylenically unsaturated carboxylic acids in amounts from 10 to 95, preferably from 20 to 70, mol %.

The monomers of group (c) are monoethylenically unsaturated dicarboxylic acids. Such dicarboxylic acids have for example from 4 to 8 carbon atoms in the molecule. Examples of monomers (c) are maleic acid, fumaric acid, itaconic acid and citraconic acid. A dicarboxylic acid of this type which is capable of forming an anhydride can also be used in the form of the anhydride. If monomers (c) are present at all in the Copolymerization, preference is given to using maleic acid or maleic anhydride. The copolymers contain units of monomers (c) in amounts from 0 to 70, preferably from 5 to 55, mol %.

Preference is given to copolymers containing (a) from 25 to 75 mol % of vinyl formate units, (b) from 20 to 70 mol % of units of monoethylenically unsaturated carboxylic acids, and (c) from 5 to 55 mol % of units of monoethylenically unsaturated dicarboxylic acids in copolymerized form.

The monomer mixtures may optionally comprise (d) other copolymerizable monoethylenically unsaturated monomers, for example acrylamide, methacrylamide, 2-acrylamido-2-methylpropanesulfonic acid, vinylsulfonic acid, allylsulfonic acid, methallylsulfonic acid, vinylphosphonic acid, allylphosphonic acid, acrylonitrile, methacrylonitrile, dimethylaminoethyl acrylate, diethylaminoethyl acrylate, diethylaminoethyl methacrylate, n-vinylpyrrolidone, n-vinylformamide, n-vinylimidazole, n-vinylimidazoline, 1-vinyl-2-methylimidazole, 1-vinyl-2-methylimidazoline and hydroxyalkyl esters having from 2 to 6 carbon atoms in the hydroxyalkyl group with monoethylenically unsaturated carboxylic acids having from 3 to 6 carbon atoms, such as hydroxyethyl acrylate, hydroxyethyl methacrylate, hydroxy-n-propyl acrylate, hydroxyisopropyl acrylate, hydroxyisobutyl acrylate, hydroxyethyl monomaleate, 1,4-butanediol monoacrylate and hydroxy-n-butyl dimaleate. The monomers of group (d) are used in the copolymerization in amounts from 0 to 30 mol %. If these monomers are used for modifying the copolymers, they are preferably used in amounts from 5 to 20 mol %.

The copolymerization of said monomers (a) and (b) and optionally (c) and/or (d) is carried out in an aqueous medium or in an organic solvent. For the purposes of the present invention, an aqueous medium comprehends water as sole solvent and mixtures of water with up to 50% by weight of other solvents miscible therewith. Water-miscible solvents include for example dioxane, tetrahydrofuran, ethylene glycol dimethyl ether, ethylene glycol dimethyl [sic] ether, diethylene glycol dimethyl ether, acetone, methyl ethyl ketone, sublohexanone [sic], methylglycol acetate and also the monohydric $C_1$- to $C_4$-alcohols such as methanol, ethanol, isopropanol, n-butanol, sec-butanol, tert-butanol and ethylene glycol.

The copolymerization can for example also be carried out as a precipitation polymerization in $C_1$–$C_3$-alkylbenzenes, aliphatic, acyclic $C_4$–$C_8$-ketones, chlorinated $C_1$–$C_4$-alkanes or mixtures thereof. Specific examples of inert organic solvents suitable for a precipitation polymerization are:

benzene, toluene, p-xylene, m-xylene, o-xylene and their technical grade mixtures, ethylbenzene, diethylbenzene, methylethylbenzene, methylene chloride, 1,2-dichloroethane, 1,1-dichloroethane, 1,1,1-trichloroethane, 1,1,2-trichloroethane, perchloroethylene, 1,2-dichloropropane, butyl chloride, fluorinated hydrocarbons, 2-butanone, 3-pentanone and also 3-hexanone.

The copolymerization can also be carried out as a solution polymerization in at least one of the abovementioned ethers or ketones or in methylglycol acetate, ethylglycol acetate and also monohydric $C_1$–$C_4$-alcohols. If dicarboxylic anhydrides are used as monomers of group (c), the copolymerization is preferably carried out in the absence of alcohols, so that the copolymers formed have anhydride groups which are accessible to further chemical reactions.

Said monomers (a) and (b) and optionally (c) and/or (d) can also be copolymerized with one another in the form of a suspension polymerization in at least one aliphatic hydrocarbon. Examples of suitable aliphatic hydrocarbons include pentane, hexane, heptane, octane, isooctane, cyclohexane, methylcyclohexane, dimethylcyclohexane, ethylcyclohexane, diethylcyclohexane and mixtures thereof. Of the contemplated aliphatic hydrocarbons, all the isomers or mixtures can be used.

A precipitation or suspension copolymerization is advantageously carried out in the additional presence of protective colloids. Examples of suitable protective colloids include copolymers of maleic anhydride and vinyl alkyl ethers which have from 1 to 20 carbon atoms in the alkyl group or copolymers of maleic anhydride and olefins having from 8 to 20 carbon atoms and their monoesters with $C_{10}$–$C_{20}$-alcohols or monoamides with $C_{10}$–$C_{20}$-amines. Also suitable for use as protective colloid are polyalkyl vinyl ethers whose alkyl group contains from 1 to 20 carbon atoms. If a protective colloid is used in the copolymerization, the amounts customarily range from 0.05 to 4% by weight, based on the monomers to be polymerized.

In a preferred embodiment, the copolymerization is carried out in water or in mixtures of water and water-miscible solvents such as ethanol, n-propanol, methanol, ethylene glycol, oligomeric water-soluble alkylene glycols and ethoxylated $C_1$–$C_{18}$-alcohols with 1–20 ethylene oxide groups, isopropanol, acetone, methyl ethyl ketone, tetrahydrofuran and dioxane.

The copolymerization can be carried out batchwise, semicontinuously or continuously in suitable reactors. The polymerization can be initiated by a single addition of a polymerization initiator and optionally a coinitiator, or the initiator and/or the coinitiator are added portionwise or continuously to the copolymerization mixture during the copolymerization. The copolymerization is preferably carried out batchwise in stirred kettles, in which case a small amount of the mixture to be polymerized, for example 5%, is initially charged and the rest of the monomers are added to the kettle continuously or batchwise under constant thorough mixing. The copolymerization is customarily carried out under an inert gas atmosphere, for example under nitrogen. Vinyl formate is preferably metered into the copolymerization mixture in the course of the copolymerization. It is of course also possible to introduce vinyl formate as initial charge and to meter in the other comonomers.

The copolymerization is carried out for example at temperatures from 10° to 150° C., preferably at from 20° to 100° C. If the copolymerization temperatures are above the boiling point of the reaction mixture, the copolymerization is carried out under superatmospheric pressure in suitable apparatus, for example pressure kettles or stirrable autoclaves..In most cases, the copolymerization is carried out under atmospheric pressure at from 30° to 70° C.

The polymerization initiator can be basically any customary compound for this purpose which forms free radicals under the conditions of the polymerization, eg. peroxides, hydroperoxides, peroxodisulfates, percarbonates, peroxyesters, hydrogen peroxide and azo compounds. Examples of initiators, which can be soluble or insoluble in water, are hydrogen peroxide, dibenzoyl peroxide, dicyclohexyl peroxodicarbonate, dilauryl peroxide, methyl ethyl ketone peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per -2-ethylhexanoate, tert-butyl, perbenzoate, lithium peroxodisulfate, sodium peroxodisufate, potassium peroxodisulfate, ammonium peroxodisulfate, azodiisobutyronitrile, 2,2'-azobis(2-amidinopropane) dihydrochloride, 2,2'-azobis(N,N'-dimethylene) isobutyramidine dihydrochloride, 2-(carbamoylazo) isobutyronitrile and 4,4'-azobis(4-cyanovaleric acid).

The initiators can be used alone or mixed with one another, for example mixtures of hydrogen peroxide and sodium peroxodisulfate. If the polymerization is carried out in an aqueous medium, water-soluble initiators are preferred. Similarly, the known redox catalysts can be used. Such systems comprise for example at least one of the above-described peroxide compounds in combination with a reducing agent, for example reducing sulfur or phosphorus compounds, eg. bisulfites, sulfites, thiosulfates, dithionites and tetrathionates of alkali metals and ammonium compounds, sodium hypophosphite, phosphorous acid and phosphites such as sodium phosphite, potassium phosphite, and ammonium phosphite. Sulfur dioxide may also be used as reducing sulfur compound. Further reducing agents for redox catalysts include for example ascorbic acid, formic acid and aldehydes, such as formaldehyde or acetaldehyde.

The redox catalysts may additionally comprise salts of transition metals, for example salts of iron, cobalt, nickel, copper, vanadium and manganese. Suitable salts include for example iron(II) sulfate, cobalt(II) chloride, nickel(II) sulfate, copper(I) chloride, manganese(II) acetate, vanadium (III) acetate and manganese(II) chloride. The known redox catalysts may comprise the reducing component in a molar ratio of from 0.05 to 1 mol per mole of the oxidizing component. The heavy metal ions are customarily used in amounts from 0.1 ppm to 0.2%, based on the redox initiator.

The initiators are generally used in amounts from 0.05 to 30, preferably from 1 to 15, % by weight, based on the monomers to be polymerized. If the polymerization is carried out in an aqueous medium, preference is given to using redox catalysts, in which case, based on the monomers to be polymerized, from 0.5 to 25% by weight of at least one peroxide initiator and from 0.05 to 30% by weight of at least one reducing agent are used. Preference is given to combinations of peroxodisulfates with alkali metal or ammonium bisulfites. For example, based on the monomers to be polymerized, from 1 to 15% by weight of sodium peroxodisulfate or potassium peroxodisulfate and from 0.5 to 25% by weight of sodium bisulfite or potassium bisulfite are used. To prepare polymers which are particularly low in residual monomer, from 2 to 10% by weight of peroxodisulfate and from 2 to 20% by weight of bisulfite are used, based on the monomers to be polymerized.

If the copolymerization is carried out in an organic solvent, initiators are used which are soluble in the organic solvent, for example acetylcyclohexanesulfonyl peroxide, diacetylperoxydicarbonate, dicyclohexyl peroxydicarbonate, di-2-ethylhexyl peroxydicarbonate, tert-butyl perneodecanoate, tert-butyl perpivalate, dilauroyl peroxide, 2,2'-azobis(2,4-dimethylvaleronitrile), tert-butyl per-2-ethylhexanoate, tert-butyl peracetate, di-tert-peroxide [sic], cumene hydroperoxide and/or tert-butyl hydroperoxide.

Acidic monomers may be used in the copolymerization in partly neutralized form. The degree of neutralization may range for example from 5 to 75% and is usually within the range from 10 to 50% by weight. Particular preference is given to degrees of neutralization below 25%. The acidic monomers are neutralized for example with alkali metal, alkaline earth metal and ammonium bases, for example with sodium hydroxide solution, potassium hydroxide solution, ammonia, magnesium oxide, calcium oxide, calcium hydroxide, sodium carbonate, sodium bicarbonate, potassium carbonate or barium oxide.

Preference is given to the copolymerization of monomer mixtures of (a) from 25 to 75 mol % of vinyl formate, (b) from 20 to 70 mol % of monoethylenically unsaturated carboxylic acids, and (c) from 5 to 55 mol % of monoethylenically unsaturated dicarboxylic acids in an aqueous medium in the presence of from 2 to 30% by weight of peroxosulfates and/or hydroperoxides. The copolymerization in an aqueous medium or in pure water as solvent is preferably carried out in the presence of from 0.05 to 30, preferably from 0.5 to 15, % by weight of a surface-active agent. The addition of a surface-active agent to the polymerization mixture promotes the uniform incorporation of the vinyl formate into the copolymer and at the same time counteracts the decomposition of vinyl formate into formic acid and acetaldehyde.

A suitable surface-active agent is any compound which reduces the surface tension of water. Such compounds are customarily used as emulsifiers in emulsion polymerization. Examples of suitable surface-active agents include alkoxylated alcohols, alkoxylated phenols, alkoxylated amines, alkoxylated carboxylic acids, alkylpolyglycoside, alkyl sulfates, alkylsulfonates, alkylbenzenesulfonates and/or block copolymers of ethylene oxide and propylene oxide.

Particularly suitable alkoxylated alcohols are prepared for example by ethoxylating alcohols having from 8 to 22 carbon atoms, for which both natural and synthetic alcohols can be used. The alcohols can be straight-chain or branched and may still contain hydroxyl groups or else one or more monoethylenically unsaturated double bonds. The alcohol ethoxylates may contain from 2 to 50, preferably from 3 to 25, mol of ethylene oxide per mole of alcohol. It is also possible to use block copolymers which are obtainable by stagewise alkoxylation of alcohols with, for example, ethylene oxide and then propylene oxide and optionally butylene oxide. The arrangement of the alkylene oxide blocks therein is optional. The addition of alkylene oxides to alcohols can also be carried out with a mixture of alkylene oxides, producing random alkoxylates.

The same principle produces the other alkoxylated compounds by adding at least one alkylene oxide to alkylphenols, amines or carboxylic acids. The alkylphenols customarily contain from 1 to 12 carbon atoms in the alkyl group. The amines may contain for example one or more amino groups in the molecule and have from 8 to 22 carbon atoms.

The carboxylic acids to be alkoxylated preferably have from 8 to 22 carbon atoms in the molecule.

Alkyl sulfates and alkylsulfonates, like the other surface-active agents mentioned, are commercially available. In most cases the alkyl group contains from 12 to 16 carbon atoms. The alkyl group of the alkylbenzenesulfonates is derived for example from straight-chain or branched alkyl radicals having from 8 to 16 carbon atoms. Suitable block copolymers of ethylene oxide and propylene oxide may have for example number average molecular weights from 300 to 10,000.

In most cases the surface-active agents are used in amounts from 0.75 to 10% by weight, based on the monomers. The amount of water or organic solvent is chosen for example to obtain polymer solutions or suspensions having a concentration of from 10 to 80, preferably from 30 to 70, % by weight of polymer.

At high concentration, the copolymers can precipitate from the solutions. However, by neutralizing with alkali metal bases or ammonia they can be redissolved or at least brought into a stable and homogeneous dispersion. The copolymers have for example K values from 10 to 120, usually from 10 to 70 (determined by the method of H. Fikentscher in 1% strength by weight aqueous solution on the sodium salt of the copolymers at pH 7 and 25° C.).

The vinyl formate copolymers may be modified by solvolysis and/or oxidation. To hydrolyze the copolymers, for example, the as-copolymerized solutions can be brought with sodium hydroxide or potassium hydroxide solution to a pH above 8 and the hydrolysis of the vinyl formate units in the copolymer into vinyl alcohol units may be speeded up, if necessary, by raising the temperature of the solution to, for example, 100° C. The hydrolysis may be partial, for example from 5 to 90%, or else be carried on to completion. The K value of the hydrolyzed copolymers is likewise within the range from 10 to 120.

The copolymers may, if desired, also be oxidized, in which case a reduction in the molecular weight is observed in most cases. Accordingly, the oxidized copolymers will have a different K value too. Their K value can be for example from 2 to 50 units below the K value of the as-copolymerized copolymers. The oxidation of the copolymers is preferably carried out in aqueous solution. The oxidizing agent used can be any compound which gives off active oxygen, for example alkaline hypochlorite solutions, ozone or hydrogen peroxide. The oxidation can be carried out for example at temperatures from 10° to 100° C. Since the oxidation is preferably carried out in an alkaline medium, the copolymers are also observed to undergo a more or less pronounced hydrolysis. The amount of the at least one oxidizing agent used in the oxidative aftertreatment of the copolymers ranges for example from 0.1 to 30, preferably from 2.5 to 25, % by weight, based on the copolymers. The oxidative treatment has the effect of improving the dispersing properties of the copolymers.

The copolymers obtainable by the process of the present invention and the vinyl alcohol copolymers obtainable therefrom by hydrolysis and/or oxidation are used as detergent and cleaner additives. In reduced-phosphate (phosphate content <25% by weight) and phosphate-free formulations, they have a marked incrustation-inhibiting effect and may be present therein in amounts from 0.1 to 30, preferably from 1 to 15, % by weight, based on the particular formulation.

The detergents and cleaners comprise at least one surfactant with or without other customary ingredients. Preference is given to using surfactants which are biodegradable.

The detergents can be pulverulent or else liquid. The compositions of detergent and cleaner formulations can vary greatly. Detergent and cleaner formulations customarily contain from 2 to 50% by weight of surfactants with or without builders. These figures apply not only to liquid but also to pulverulent detergents. Detergent and cleaner formulations customary in Europe, the U.S. and Japan are given for example in table form in Chemical and Engn. News 67 (1989), 35. Further details about the compositions of detergents and cleaners can be found in WO-A-90/13581 and in Ullmann's Encyklopädie der technischen Chemie, Verlag Chemie, Weinheim, 1983, 4th Edition, pages 63–160. The detergents may additionally contain a bleaching agent, for example sodium perborate, which if used may be present in the detergent formulation in amounts of up to 30% by weight. The detergents and cleaners may contain further customary additives, for example complexing agents, opacifiers, optical brighteners, enzymes, perfume oils, color transfer inhibitors, grayness inhibitors, soil release polymers and/or bleach activators.

The K values of the copolymers were determined by the method of H. Fikentscher, Cellulose-Chemie 13 (1932), 58–64, 71–74, in aqueous solution on the sodium salts of the copolymers at a concentration of 1% by weight, a pH of 7 and a temperature of 25° C.

The percentages in the Examples are by weight.

EXAMPLES

Example 1

A stirred 2 l glass reactor equipped with a horseshoe stirrer and 4 add vessels was charged with 49.1 g of maleic anhydride together with 18.0 g of a 20% strength aqueous solution of an addition product of 25 mol of ethylene oxide with isooctylphenol and 10.3 g of a 35% strength aqueous solution of the sulfate of an addition product of 125 mol of ethylene oxide with isooctylphenol in 190 ml of water, followed by 20.2 g of 50% strength sodium hydroxide solution for partial neutralization, and heated to an internal temperature of 45° C. with an inert gas atmosphere. To this solution were added 180 g of vinyl formate and 144.2 g of acrylic acid as separate feeds over 5 h. Starting at the same time, the metered addition over 6 h was commenced of a solution of 18.7 g of sodium peroxodisulfate in 168.3 ml of water and 28.0 g of sodium bisulfite in 250 ml of water. All the while the temperature of the reaction mixture was held at 45° C. On completion of the stream additions the reaction mixture was heated at 45° C. for a further 2 h. The solution was cooled down to room temperature and adjusted with sodium hydroxide solution to pH 7 with cooling. The polymer had a K value of 50.4.

Example 2

A stirred 2 l glass reactor equipped with a horseshoe stirrer and 4 add vessels was charged with 98.7 g of maleic anhydride together with 12.5 g of a 20% strength aqueous solution of an addition product of 25 mol of ethylene oxide with isooctylphenol and 7.2 g of a 35% strength aqueous solution of the sulfate of an addition product of 25 mol of ethylene oxide with isooctylphenol in 190 ml of water, followed by 80.5 g of 50% strength sodium hydroxide solution for partial neutralization, and heated to an internal temperature of 45° C. with an inert gas atmosphere. To this solution were added 125.2 g of vinyl formate and 175.3 g of acrylic acid as separate feeds over 5 h. Starting at the same time, the metered addition over 6 h was commenced of a solution of 20.4 g of sodium peroxodisulfate in 183.8 ml of water and 28.0 g of sodium bisulfite in 263 ml of water. All the while the internal temperature of the reaction mixture was held at 45° C. On completion of the stream additions the reaction mixture was heated at 45° C. for a further 2 h. The solution was cooled down to room temperature and adjusted with sodium hydroxide solution to pH 7 with cooling. The polymer had a K value of 37.4.

Example 3

A stirred 2 l glass reactor equipped with a horseshoe stirrer and 4 add vessels was charged with 56.4 g of maleic anhydride together with 25.0 g of a 20% strength aqueous solution of an addition product of 25 mol of ethylene oxide with isooctylphenol and 14.3 g of a 35% strength aqueous solution of the sulfate of an addition product of 25 mol of ethylene oxide with isooctylphenol in 190 ml of water, followed by 46.0 g of 50% strength sodium hydroxide solution for partial neutralization, and heated to an internal temperature of 45° C. with an inert gas atmosphere. To this solution were added 250 g of vinyl formate and 100.2 g of acrylic acid as separate feeds over 5 h. Starting at the same time, the metered addition over 6 h was commenced of a solution of 20.4 g of sodium peroxodisulfate in 183.8 ml of water and 28.0 g of sodium bisulfite in 263 ml of water. All the while the internal temperature of the reaction mixture was held at 45° C. On completion of the stream additions the reaction mixture was heated at 45° C. for a further 2 h. The solution was cooled down to room temperature and adjusted with sodium hydroxide solution to pH 7 with cooling. The polymer had a K value of 41.7.

Example 4

A stirred 2 l glass reactor is charged with a solution of 138.2 g of maleic anhydride in 518.1 g of xylene under a blanket of nitrogen. The initial charge is heated to 85° C. To this solution is added over 2 h a solution of 100.8 g of acrylic acid and 100.8 g of vinyl formate in 221.2 g of xylene. At the same time the metered addition over 3 h is commenced of a solution of 7.11 g of tert-butyl per-2-ethylenehexanoate [sic] in 92.9 g of xylene. During the polymerization the internal temperature is held at 80° C. On completion of the stream additions the reaction mixture is heated at 80° C. for a further hour. The polymer formed is separated off by filtration and dried.

Example 5

100 g of the polymer of Example 4 are admixed with 200 ml of fully demineralized water and heated to the boil for 2 h. The solution is then neutralized with 94 g of sodium hydroxide solution (50%). The polymer had a K value of 39.7.

Example 6

A stirred 2 l glass reactor is charged with a solution of 137.2 g of maleic anhydride in 520.5 g of tetrahydrofuran under a blanket of nitrogen. The initial charge is heated to 65° C. To this solution is added over 2 h a solution of 100.8 g of acrylic acid and 100.8 g of vinyl formate in 221.2 g of tetrahydrofuran. At the same time, the metered addition over 3 h is commenced of a solution of 9.48 g of tert-butyl perpivalate [lacuna] 90.5 g of tetrahydrofuran. During the polymerization the internal temperature is held at 65° C. On completion of the stream additions the reaction mixture is heated at 65° C. for a further hour. Steam is introduced to distill tetrahydrofuran off as an azeotrope. The aqueous solution of the terpolymer obtained is adjusted to pH 7 with sodium hydroxide solution. The polymer had a K value of 15.6.

Use Examples

The incrustation-inhibiting properties of the polymers were determined in a wash test. In each case test fabrics made of cotton were washed. The number of wash cycles was 15. Following this number of washes, the ash content of the test fabric was determined by ashing. The lower the ash content after repeated washing, the greater the effectiveness of the polymer as an incrustation inhibitor. The ash values obtained are indicated in Table 3. The copolymers of the present invention show distinct effectiveness over Comparative Example 1 (no polymer) and Comparative Example 2 featuring a commercially available copolymer as incrustation inhibitor. The polymers of the present invention show in some instances distinct improvements over the standard.

TABLE 1

Wash conditions

| Washing apparatus | Launderometer |
| --- | --- |
| Wash liquor | 250 g |
| Detergent dosage | 6 g/l |
| Wash time | 30 min |
| Wash temperature | 60° C. |
| Liquor ratio | 12.5:1 |
| Number of wash cycles | 15 |
| Test fabric | 20 g of woven cotton |

TABLE 2

Detergent composition

| | % by weight |
| --- | --- |
| Alkylbenzenesulfonate | 8.00 |
| $C_{13}/C_{15}$ Oxo alcohol ethoxylated with 7 EO [1] | 7.00 |
| Fatty acid, sodium salt | 2.00 |
| Carboxymethylcellulose | 1.00 |
| Zeolite A (Wessalith P) | 36.00 |
| Sodium carbonate | 12.00 |
| Sodium perborate * 3 $H_2O$ | 22.0 |
| TAED [2] | 2.00 |
| Optical brightener | 0.20 |
| Enzymes | 0.50 |
| Polymer (test substrate) | 5.00 |
| Sodium sulfate | remainder to 100 |

[1] EO = ethylene oxide
[2] TAED = tetraacetylethylenediamine

The results of the wash trials are reproduced in Table 3:

TABLE 3

Wash series

| Example No. | Comparative Example No. | Polymer No. | Ash [%] |
| --- | --- | --- | --- |
| 7 | — | 1 | 2.1 |
| — | 1 | — | 3.2 |
| 8 | — | 6 | 0.8 |
| — | 2 | AA/MA [3] | 2.2 |

[3] copolymer of acrylic acid and maleic acid in a weight ratio of 70:30 with a K value (measured on the sodium salt in 1% strength aqueous solution) of 60.

We claim:

1. Vinyl formate copolymers containing
   (a) from 5 to 90 mol % of vinyl formate units,
   (b) from 10 to 95 mol % of units of monoethylenically unsaturated carboxylic acids,
   (c) from 0 to 70 mol % of units of monoethylenically unsaturated dicarboxylic acids, and
   (d) from 0 to 30 mol % of units of other monoethylenically unsaturated monomers in copolymerized form and having K values of at least 8 (determined by the method of H. Fikentscher in 1% strength by weight aqueous solution on the sodium salt of the copolymers at pH 7 and 25° C.).

2. Vinyl formate copolymers as claimed in claim 1 containing
   (a) from 25 to 75 mol % of vinyl formate units,
   (b) from 20 to 70 mol % of units of monoethylenically unsaturated carboxylic acids, and
   (c) from 5 to 55 mol % of units of monoethylenically unsaturated dicarboxylic acids in copolymerized form.

3. A process for preparing vinyl formate copolymers as claimed in claim 1 which comprises copolymerizing monomer mixtures of
   (a) from 5 to 90 mol % of vinyl formate,
   (b) from 10 to 95 mol % of monoethylenically unsaturated carboxylic acids,
   (c) from 0 to 70 mol % of monoethylenically unsaturated dicarboxylic acids, and
   (d) from 0 to 30 mol % Of other monoethylenically unsaturated monomers in an aqueous medium or in an organic solvent in the presence of free-radical polymerization initiators.

4. A process as claimed in claim 3 wherein monomer mixtures of
   (a) from 25 to 75 mol % of vinyl formate,
   (b) from 20 to 70 mol % of monoethylenically unsaturated carboxylic acids, and
   (c) from 5 to 55 mol % of monoethylenically unsaturated dicarboxylic acids are copolymerized in an aqueous medium in the presence of from 2 to 30% by weight of peroxosulfates and/or hydroperoxides.

5. A process as claimed in claim 3, wherein the copolymerization is carried out in the presence of from 0.05 to 30% by weight, based on the monomers, of at least one surface-active agent.

6. A process as claimed in claim 5, wherein the surface-active agents used are alkoxylated alcohols, alkoxylated phenols, alkoxylated a/nines or alkoxylated carboxylic acids, alkyl sulfates, alkylsulfonates, alkylbenzenesulfonates and/or block copolymers of ethylene oxide and propylene oxide.

7. A composition, comprising the vinyl formate copolymer of claim 1 and a detergent or cleaner.

* * * * *